United States Patent [19]

Liljegren

[11] Patent Number: 5,787,229

[45] Date of Patent: Jul. 28, 1998

[54] ELECTRIC HOT WATER TANK WITH LAYERED STORAGE

[75] Inventor: Leif Liljegren, Oakland, N.J.

[73] Assignee: South Breeze Corporation, Warrenton, Va.

[21] Appl. No.: 642,431

[22] Filed: May 3, 1996

[51] Int. Cl.⁶ .................................................... A61M 16/00
[52] U.S. Cl. .................... 392/492; 372/490; 372/491; 372/494; 126/344; 126/361; 122/4 A
[58] Field of Search ............................ 392/445, 450, 392/484, 485, 490, 492, 491, 494; 126/344, 361; 122/4 A, 3.1

[56] References Cited

U.S. PATENT DOCUMENTS

| 1,437,046 | 9/1922 | Dominguez | 392/492 |
| 1,767,122 | 7/1930 | Dean | 392/492 |

FOREIGN PATENT DOCUMENTS

| 225520 | 12/1941 | Sweden | 392/492 |
| 2124348 | 2/1984 | United Kingdom | 392/449 |

*Primary Examiner*—Teresa J. Walberg
*Assistant Examiner*—Quan Nguyen
*Attorney, Agent, or Firm*—Baker & Botts

[57] ABSTRACT

An electric hot water heater tank is fitted with a plurality of separators that divide the tank into a plurality of chambers surrounding the tank axis and extending between the top and bottom walls. The adjacent chambers communicate alternately in a direction radially outwardly with respect to the axis proximate to the top wall and proximate to the bottom wall such that water flows through the adjacent chambers in opposite directions generally parallel to the axis. An electric heating element is received in the innermost chamber, and a cold water supply inlet conduit leads from outside the tank into the innermost chamber. A hot water outlet conduit leads from the outermost chamber to outside the tank. An optional venturi injector draws water from one of the chambers radially inward from the outermost chamber and injects it into the outlet conduit.

14 Claims, 2 Drawing Sheets

ELECTRIC HOT WATER TANK WITH LAYERED STORAGE

BACKGROUND OF THE INVENTION

Hot water heaters are subject to "standby losses," losses of heat that occur when the energy source for heating the water is off. In water heaters energized by combustion of a fossil fuel (natural gas, propane, and oil), the predominant part, usually 80% or more, of the standby loss is through the vent from the heating pipe that runs through the tank and by which heat from the combustion gases is transferred to the water. The constant flow of ventilation air to carry away combustion gases from the pilot burner draws heat from the water in the tank at a relatively high rate. Losses of heat through the external walls of the tank in water heaters energized by fossil fuel, though much less than the losses through the vent pipe, are also significant. Because fossil fuels are considerably less expensive, at least in the United States, than electric energy on a per heat unit basis, hot water heaters energized by fossil fuels are competitive on an operating cost basis with electric hot water heaters despite a higher purchase price and larger standby losses.

Electric water heaters are subject to standby losses only in the form of heat loss from t he walls of the tank, because there is no heating and vent pipe. The magnitude of through-the-wall losses is a function of the heat transfer rate through the tank walls, which can be minimized but not eliminated by good insulation, the area of the walls, and the temperature difference between the water in the tank and the environment outside the tank. Conventional electric hot water heaters are usually operated with the water at a temperature of between 120° F. and 140° F., in order to deliver hot water at a temperature that will not burn or scald a user. For a given demand (total available heat content of the water) for hot water stored at a uniform temperature, the lower the storage temperature, the larger is the size of the tank that is required to meet the demand. A larger tank storing water at a lower temperature will be subject to a standby loss generally comparable to that of a smaller tank storing water at a higher temperature, inasmuch as the effects on heat loss due to tank surface area are offset by the effects due to temperature difference between the stored water and the environment of the tank.

SUMMARY OF THE INVENTION

One object of the present invention is to minimize the standby losses of an electric hot water heater for a tank of a given size and thereby reduce the operating costs, as compared to previously known electric hot water heaters. Another object is to provide an electric water heater that, for a given demand (in terms of the total heat content of the stored water), is considerably smaller in size and weight and is thus less expensive to manufacture and requires less space than presently known electric hot water heaters. Another object is to make it economically advantageous for several small electric hot water heaters, each located nearby a demand point, to replace a single large water heater, thereby reducing losses from long runs of hot water piping.

The foregoing objects are attained, in accordance with the present invention, by an electric hot water heater in which a plurality of separators are received in the tank between the axis and the peripheral wall in mutually spaced apart relation and divide the tank into a plurality of chambers surrounding the axis and extending between the top and bottom walls. The adjacent chambers communicate alternately in a direction radially outwardly with respect to the axis proximate to the top wall and proximate to the bottom wall such that water flows through the adjacent chambers in opposite directions generally parallel to the axis. An electric heating element is received in the innermost chamber, and a cold water supply inlet conduit leads from outside the tank into the innermost chamber. A hot water outlet conduit leads from the outermost chamber to outside the tank.

The array of radially adjacent chambers in the tank permits the water to be stored in the tank in several layers, the average temperature of the water in each layer being different. The highest temperature water is contained in the innermost layer and the lowest in the outermost layer. By having the outermost layer at the lowest temperature in the tank, the heat loss through the tank walls is minimized, thereby reducing operating costs. Meanwhile, the average temperature of all water in the tank will be considerably higher than the temperature in the outermost layer. Therefore, a significantly smaller size tank will be required for a given demand in terms of the total heat content of the water stored in the tank. The relatively low cost and small size of a hot water heater embodying the present invention make it feasible to have several hot water heaters, each located near a point of use, in a residence or other facility. Such an arrangement can considerably reduce installation costs for a hot water system based on local tanks and no hot water distribution piping. Operating costs are further reduced by minimizing heat losses in a hot water piping system. It is postulated that an eight gallon water heater embodying the present invention will have a demand capacity equal to that of a 30 gallon fossil-fueled water heater and will cost about one-third as much to manufacture. The small size of a water heater embodying the present invention also makes it well suited for use in, for example, camp trailers, mobile homes, boats, and seasonal vacation homes.

Another advantage of the invention is that hot water is drawn from the coolest layer in the tank. Therefore, the danger of excessively hot water flowing to a faucet, that could scald or burn a user, is reduced.

Still another advantage is that it is the cold supply water entering the tank to replace hot water drawn from the tank that is heated by the heating element. The cool incoming water accepts heat from the heating elements at a greater rate than warmer water would. The heating elements also operate at a generally lower temperature, which should increase their service life.

In an preferred arrangement, each separator is affixed to one of the top and bottom walls of the tank and the other end is spaced apart from the other of the top and bottom walls. The space at the unattached end of each separator provides a flow passage for water to flow from each layer to the adjacent layer. With such an arrangement, it is not necessary to form openings in the separators for communication to an adjacent chamber, thus saving production costs.

Generally, it is suitable for all chambers, other than the outermost chamber, to be of substantially equal volumes. It is advantageous, though not required, that the volume of the outermost chamber be equal to about one-eighth of the volume of the tank in order to provide for a relatively high average temperature of the total volume of water; keeping the volume of the coolest water in the tank relatively low, of course, increases the volumes of each of the chambers containing hotter water. The higher average temperature allows the size of the tank to be kept low for a given demand capacity.

According to yet another aspect of the present invention, a tank constructed in the manner described above, that is, with separators forming concentric chambers providing for storage of the water in layers with a temperature gradient from the innermost layer to the outermost layer, is provided with a venturi injector device associated with the hot water outlet for drawing water from a chamber radially inwardly from the outermost chamber and mixing it with the water drawn through the outlet conduit. In an exemplary embodiment, the venturi injector device includes a hot water transfer conduit having an inlet in the radially inward chamber of the tank and an outlet having a hot water discharge nozzle extending into an inlet end portion of the tank outlet conduit and a cold water conduit connected to a cold water supply line and having a cold water discharge nozzle received in the inlet of the hot water transfer conduit.

The venturi injector device, which is optional, provides for adding water at a higher temperature to the relatively cool hot water drawn from the outermost chamber, thereby increasing the temperature of the water delivered through the tank outlet conduit. For example, it may be desired to draw water at a higher temperature than exists in the outermost chamber for a kitchen sink and dishwasher or a clothes-washing machine.

The venturi injector device can be used with configurations of water heater tanks other than the one described above. In its broadest aspect, the present invention provides a hot water heater that has a tank containing water at a first temperature in a first region and water at a second temperature in a second region, the first and second temperatures being substantially different. A hot water outlet conduit leads from the first region to outside the tank. A venturi injector includes a water transfer conduit having an inlet in the second region and an outlet having a water discharge nozzle extending into the outlet conduit and a cold water injector conduit connected to a cold water supply line and having a cold water discharge nozzle received in the inlet end of the water transfer conduit. The venturi injector provides for combining water drawn from the two sections of the tank for delivery from the tank through the hot water outlet.

For a better understanding of the invention, reference may be made to the following description of an exemplary embodiments, taken in conjunction with the accompanying drawing.

DESCRIPTION OF THE EMBODIMENT

Figure 1:
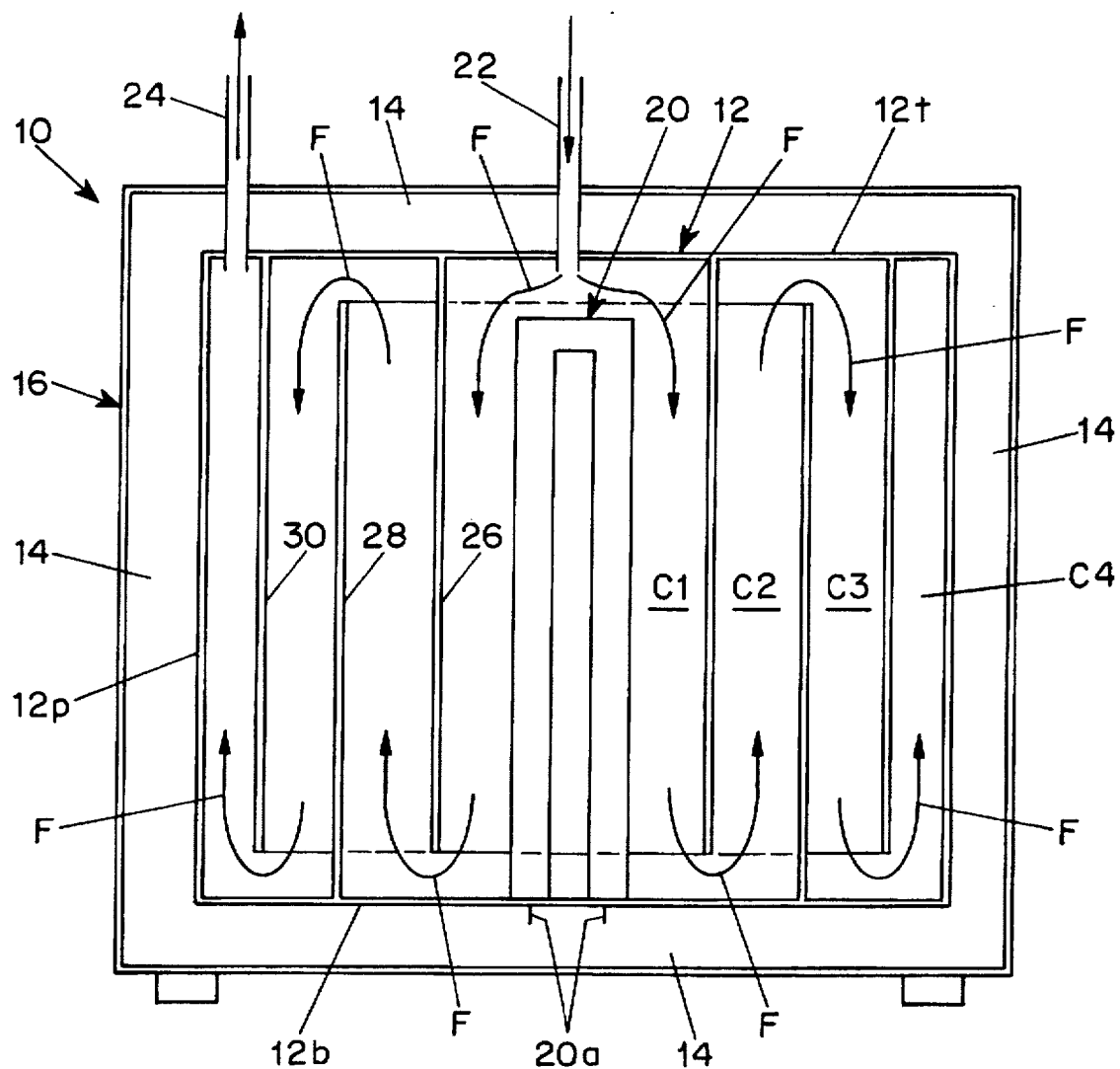
FIG. 1 is a schematic cross-sectional view of a first embodiment of a hot water heater according to the present invention.

In the embodiment of FIG. 1, a water heater 10, which may be of any suitable, conventional construction, includes a tank 12 capable of containing water under a supply pressure substantially above atmospheric pressure. The tank has top and bottom walls 12$t$ and 12$b$ and a circular cylindrical peripheral wall 12$p$. Insulation 14 covers all walls of the tank, and an outer casing 16 is installed over the insulation. The water is heated by an electrical heating element 20, which is located in the center of the tank and has terminals 20$a$ extending out through the bottom wall 12$t$ for connecting the element to a source of electric power. A cold water supply conduit 22 for delivering water from a supply line passes through the top wall 12$t$ of the tank at substantially the center. A hot water outlet conduit 24 passes through the top wall 12$t$ at a point near the perimeter wall 12$p$.

The tank 12 is divided into four chambers C1, C2, C3 and C4 by three separators 26, 28 and 30, each of which is a circular cylindrical tube and is concentric to the center axis of the peripheral wall 12$p$ of the tank 12. The upper ends of the separators 26 and 30 are attached to the top wall 12$t$ of the tank. The lower ends of the separators 26 and 30 are spaced apart from the bottom wall 12$b$ of the tank, thus leaving a space for water to flow from chamber C1 to chamber C2 and from chamber C3 to chamber C4. The lower end of the separator 28 is attached to the bottom wall 12$b$ of the tank. The upper end of the separator 28 is spaced apart from the top wall 12$t$ of the tank, thus leaving a space for water to flow from chamber C2 to chamber C3.

The division of the tank into chambers provides for holding the water in the tank in layers. The innermost chamber C1 contains the heating element 20, which transfers heat to the innermost layer of water when the element is energized. The outermost layer held in chamber C4 is adjacent the perimeter wall 12$t$ of the tank 12 and loses heat to the environment outside the tank through the perimeter wall 12$p$. The layering of the tank by means of the separators reduces heat transfer within the total volume of water by thermally induced flows and sets up a gradient of temperatures, the hottest water being within the innermost layer (chamber C1), the next two layers (chambers C2 and C3) being at successively lower temperatures, and the outermost layer (chamber C4) being at the lowest temperature (by virtue of losing heat to the environment.

It is preferred that the separators be made of a material, such as a polymeric foam, that has a low coefficient of thermal conductivity, so that a desired gradient of temperatures is set up among the layers. For example, a suitable design for the separators may provide the following average temperatures in the layers: C1—260° F.; C2—220° F.; C3—180° F.; and C4—140° F.

It is advantageous for the outermost layer to have a lower volume than each of the other layers in order to reduce, relatively, the amount of cooler water in the tank and increase, relatively, the amount of hotter water in the tank for a given total volume. The advantageous effect of storing cooler water adjacent the perimeter wall, which reduces the rate of heat transfer (loss) through the tank wall to the environment outside the tank, is maintained, and the tank may be made smaller for any given total heat content of the stored water—i.e., demand capacity.

When a faucet is opened and hot water is drawn from the tank though the hot water outlet conduit 24, the water reaching the faucet is at a low enough temperature to prevent burning or scalding. As the relatively cooler water is drawn off, it is replaced by hotter water from the next inner layer, which means the user may need to increase progressively the cold water supply at the faucet as increasingly hot water is drawn from the tank. The layering effect, however, delivers volumes of water at fairly uniform temperatures, with thresholds between successively higher temperature volumes, as each layer is drawn off.

The increases in the temperature of the water drawn from tank may be eliminated by including a hot/cold water mixing valve in the discharge pipe. Such valves, which are commercially available, automatically mix cold water from the supply with hot water from the tank and deliver hot water at a thermostatically controlled temperature, which can be adjusted.

As hot water is drawn from the tank, it is replaced by cold water from the supply, which enters the center chamber C1. Soon after cold water enters the chamber C1, the heating element is energized, and heating of the replacement cold water begins and continues until the water in the center chamber C1 reaches the desired temperature. The rate of heat transfer to the cold water from the heating element is favorable due to the large temperature difference. Meanwhile, the relatively hot water in the outer layer (chamber C4) losses heat to the environment through the tank peripheral wall 12p. The heat flow after time stabilizes, and the gradient attains the steady state, stand-by condition.

The embodiment of FIG. 1 is, of course, subject to many modifications and variations, as will be apparent to those skilled in the art. For example, the separators may be molded integrally with top and bottom panels that are received within the tank in engagement with the respective top and bottom walls of the tank. The top and bottom walls of the tank may be spherical for better structural efficiency. An annular flow control baffle that extends radially partway across the outermost chamber near the top wall 12t and forms an annular orifice can be added to the separator 30 to distribute the flow from the chamber C3 to the chamber C4 evenly around the perimeter of the tank and prevent short-circuiting of the flow to the hot water outlet conduit 24 along only one side of the tank. Each separator can extend the full height of the tank and have notches in the end or holes near the end to provide flow passages between adjacent chambers.

Figure 2:
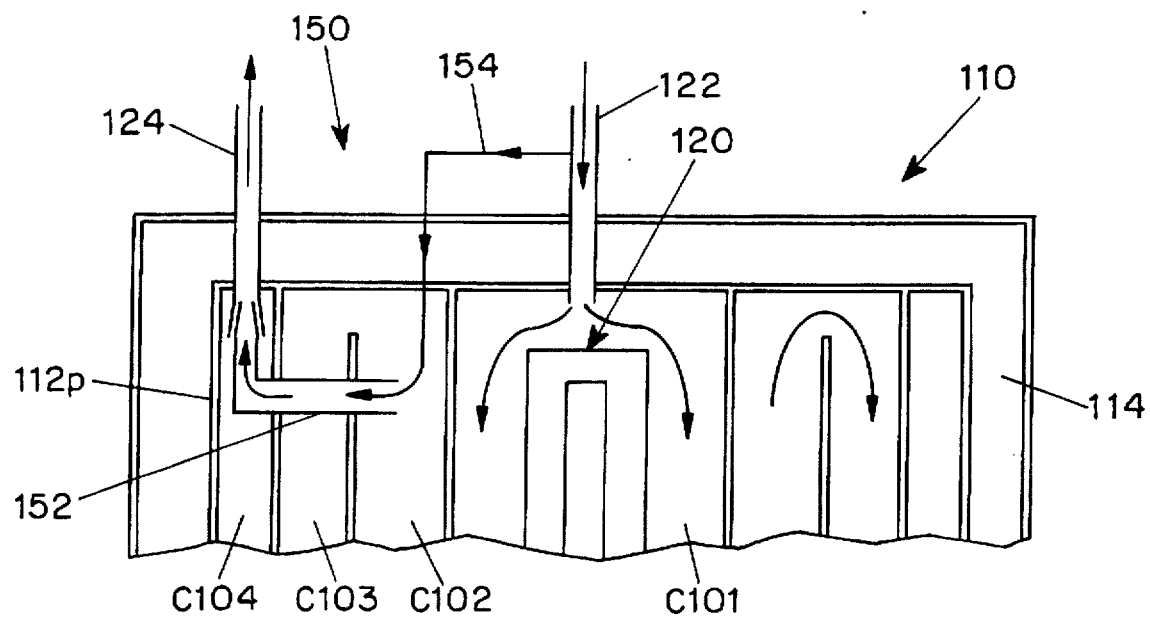
FIG. 2 is a schematic cross-sectional view of a portion of a second embodiment of a hot water heater according to the present invention, which incorporates a venturi injector device.
Figure 3:
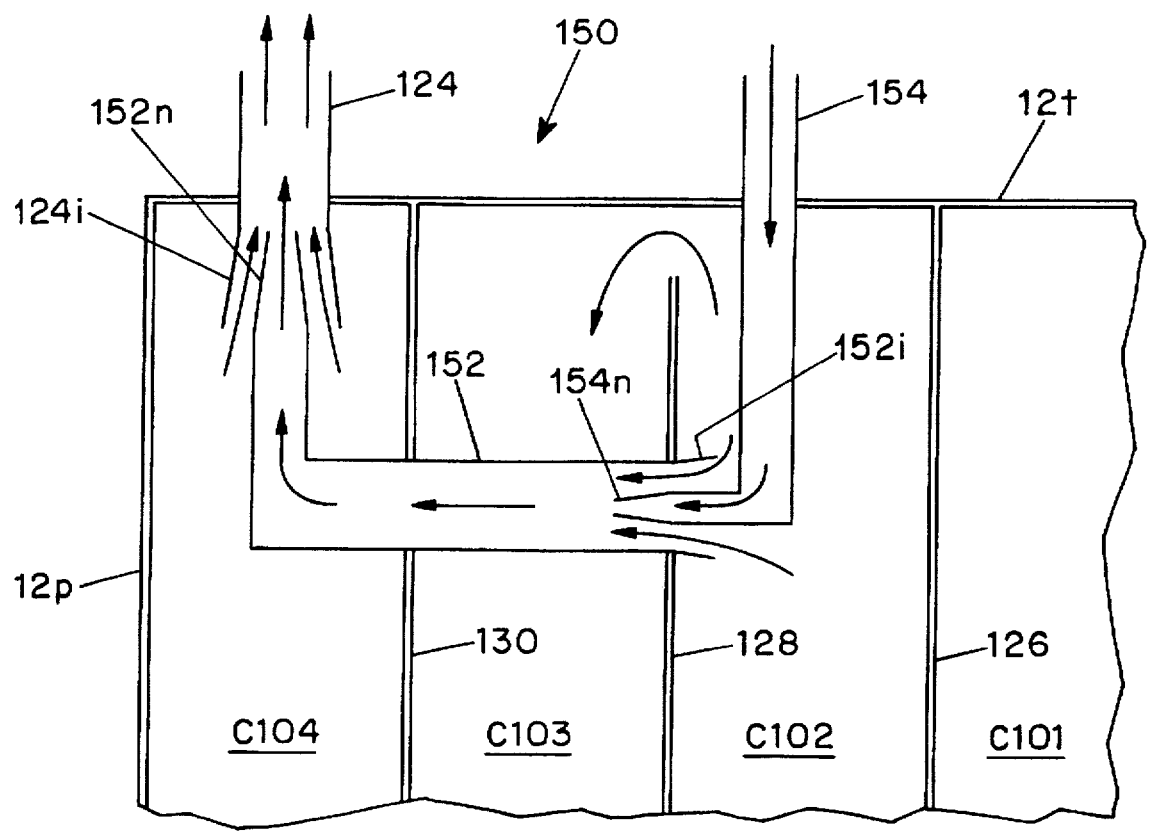
FIG. 3 is a schematic cross-sectional view of the venturi injector device of the embodiment of FIG. 2.

The embodiment of FIGS. 2 and 3 is similar to that of FIG. 1, except that includes a venturi injector device 150 associated with the hot water outlet. The same reference numerals applied to FIG. 1, but increased by 100, are applied to FIGS. 2 and 3, and the foregoing description is applicable to the embodiment of FIGS. 2 and 3.

As described above, the layer of water in the outermost chamber C104 is the coolest water in the tank under stable thermal conditions. When it is desired to provide for delivery of water at a higher temperature than that of the water stored in the chamber C104, the venturi injector device 150 provides for discharge of a mixture of water from the layer in the chamber C104 with higher temperature water from another of the chambers, which in the illustrated case is the chamber C102. A hot water transfer conduit 152 leads from an inlet end 152i located in the chamber C103 to an outlet end in the form of a discharge nozzle 152n that extends into the inlet end 124i of the hot water outlet conduit 124. A small diameter cold water injector pipe 154 branches off from the supply pipe 122 and leads to a nozzle 154n that is received in the inlet end 152i of the hot water transfer conduit. The nozzle 154n and the inlet end 152i of the hot water transfer conduit form a venturi injector, by which hot water is drawn from the chamber C102 into the pipe 152 and injected by the nozzle 152n into the hot water outlet conduit 124. Similarly, the nozzle 152n and the inlet end 124i of the hot water transfer conduit form a venturi injector, by which hot water is drawn from the chamber C104 into the transfer conduit 152. Thus, the water drawn from the tank through the hot water outlet conduit 124 is a mixture of relatively cooler water from the outer layer in the chamber C104 and relatively hotter water from the layer in the chamber C102.

The venturi injector may, of course, have its inlet (to the hot water transfer conduit 152) in any of the relatively hotter layers (C103, C102 or C101). The venturi injector is particularly useful in local hot water tanks for supplying kitchen sinks, dishwashers and clothes washers, for which relatively hot water may be desired.

As water is drawn from the tank, the temperature in the outer layer in chamber C104 becomes progressively hotter, while cold water coming from the supply flows to the layer in the chamber in which the hot water transfer conduit is located. At some point, the temperature of the water drawn from the outer layer in chamber C104 may exceed that of the water delivered by the ejector 150.

A hot/cold water mixing valve may be used with the embodiment of FIGS. 2 and 3, heater of any type (including those heated by fossil fuels) in which water stored in different regions in the tank is at significantly different temperatures. The venturi ejector can also be installed to draw relatively cooler water from one place in a tank and add it to an outflow of relatively hotter water.

I claim:

1. An electric water heater comprising a tank having top and bottom walls and a peripheral wall having an axis, the tank being adapted to contain water at a predetermined pressure above atmospheric pressure, a plurality of separators received in the tank between the axis and the peripheral wall in mutually spaced-apart relation and dividing the tank into a plurality of chambers surrounding the axis and extending between the top and bottom walls, adjacent chambers communicating alternately in a direction radially outwardly with respect to the axis proximate to the top wall and proximate to the bottom wall such that water flows through the adjacent chambers in opposite directions generally parallel to the axis, an electric heating element received in the innermost chamber, an inlet conduit leading from outside the tank into the innermost chamber, an outlet conduit leading from the outermost chamber to outside the tank, and venturi injector means associated with the outlet conduit for drawing water from a chamber radially inwardly from the outermost chamber and mixing it with the water drawn through the outlet conduit from the outermost chamber.

2. An electric water heater according to claim 1 wherein the peripheral wall of the tank and all of the separators are circular cylindrical and are concentric with the axis.

3. An electric water heater according to claim 1 wherein one end of each separator is affixed to one of the top and bottom walls of the tank and the other end is spaced apart from the other of the top and bottom walls.

4. An electric water heater according to claim 1 wherein the volumes of the chambers are substantially equal.

5. An electric water heater according to claim 1 wherein the volume of the outermost chamber is equal to about one-eighth of the volume of the tank.

6. An electric water heater according to claim 1 wherein the tank has four chambers.

7. An electric water heater according to claim 6 wherein the volumes of the chambers are substantially equal.

8. An electric water heater according to claim 6 wherein the volume of the outermost chamber is equal to about one-eighth of the volume of the tank.

9. An electric water heater according to claim 1 wherein the venturi injector means includes a hot water transfer conduit having an inlet in the radially inward chamber of the tank and an outlet having a hot water discharge nozzle extending into an inlet end portion of the tank outlet conduit, and a cold water injector conduit connected to a cold water supply line and having a cold water discharge nozzle received in the inlet of the hot water transfer conduit.

10. A water heater comprising a tank having top and bottom walls and a circular cylindrical peripheral wall having an axis, the tank being adapted to contain water at a predetermined pressure above atmospheric pressure, a plurality of circular cylindrical separator walls received in the tank in spaced apart relation and concentric to the axis and dividing the tank into a plurality of radially adjacent chambers, communication passages connecting adjacent chambers alternately in a direction radially outwardly with respect to the axis proximate to the top wall and proximate to the bottom wall such that water flows through the adjacent chambers in opposite directions generally parallel to the axis, means for heating the water in the innermost chamber, a cold water inlet conduit leading from outside the tank into the innermost chamber, and a hot water outlet conduit leading from the outermost chamber to outside the tank, and venturi injector means associated with the hot water outlet conduit for drawing water from a chamber radially inwardly from the outermost chamber and mixing it with the water drawn from the outermost chamber.

11. A hot water heater according to claim 10 wherein the venturi injector means includes a hot water transfer conduit having an inlet in the radially inward chamber of the tank and a hot water discharge nozzle extending into an inlet end portion of the tank outlet conduit, and a cold water injector conduit connected to a cold water supply line and having a cold water outlet nozzle received in the inlet of the hot water transfer conduit.

12. A water heater comprising a tank having an external wall, a plurality of separators received in the tank in spaced apart relation and dividing the tank into a plurality of chambers including an outer chamber adjacent at least a part of the external wall, means for supplying heat to a first one of the chambers remote from the external wall, communication passages connecting the chambers such as to form at least one tortuous flow path placing the plurality of chambers in communication in a series starting from the first chamber and ending with the outer chamber, a cold water inlet conduit leading from outside the tank into the first chamber, a hot water outlet conduit leading from the outer chamber to outside the tank, and venturi injector means associated with the hot water outlet conduit for drawing water from a chamber upstream in the series flow path from the outer chamber and mixing it with the water drawn through the outlet conduit.

13. A water heater according to claim 12 wherein the venturi injector means includes a hot water transfer conduit having an inlet in the upstream chamber and an outlet having a hot water discharge nozzle extending into an inlet end portion of the outlet conduit, and a cold water injector conduit connected to a cold water supply line and having a cold water discharge nozzle received in the inlet of the hot water transfer conduit.

14. A water heater comprising a tank containing water at a first temperature in a first region and water at a second temperature in a second region, the first and second temperatures being substantially different, a hot water outlet conduit leading from the first region to outside the tank, and venturi injector means having a water transfer conduit having an inlet in the second region and as an outlet a water discharge nozzle extending into the hot water outlet conduit, and a cold water injector conduit having an inlet outside the tank adapted to be connected to a cold water supply line and having as an outlet a cold water discharge nozzle, the discharge nozzle being received in the inlet of the water transfer conduit.

* * * * *